United States Patent
Tanaka et al.

(10) Patent No.: US 10,472,499 B2
(45) Date of Patent: Nov. 12, 2019

(54) RESIN COMPOSITION AND RESIN MOLDED ARTICLE THEREOF

(71) Applicant: FUJI XEROX CO., LTD., Tokyo (JP)

(72) Inventors: Ryo Tanaka, Kanagawa (JP); Kana Miyazaki, Kanagawa (JP); Masahiro Moriyama, Kanagawa (JP); Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 68 days.

(21) Appl. No.: 15/908,130

(22) Filed: Feb. 28, 2018

(65) Prior Publication Data

US 2019/0092927 A1 Mar. 28, 2019

(30) Foreign Application Priority Data

Sep. 26, 2017 (JP) ................................. 2017-184697

(51) Int. Cl.
| | | |
|---|---|---|
| C08L 1/12 | (2006.01) | |
| C08L 1/14 | (2006.01) | |
| C08L 1/10 | (2006.01) | |
| C08L 33/12 | (2006.01) | |
| C08L 67/04 | (2006.01) | |

(52) U.S. Cl.
CPC ................. *C08L 1/12* (2013.01); *C08L 1/10* (2013.01); *C08L 1/14* (2013.01); *C08L 33/12* (2013.01); *C08L 67/04* (2013.01)

(58) Field of Classification Search
CPC ...... C08L 1/12; C08L 1/10; C08L 1/14; C08L 33/12; C08L 67/04
USPC ........................................................ 524/41
See application file for complete search history.

(56) References Cited

U.S. PATENT DOCUMENTS

| | | |
|---|---|---|
| 2,668,182 A | 2/1954 | Miller |
| 4,057,357 A | 11/1977 | Daghe et al. |
| 2013/0131221 A1* | 5/2013 | Basu .................. C08L 1/10 524/32 |

FOREIGN PATENT DOCUMENTS

| | | |
|---|---|---|
| JP | S59-96123 A | 6/1984 |
| JP | H07-33861 A | 2/1995 |
| JP | 2010-037485 A | 2/2010 |
| JP | 5298496 B2 | 9/2013 |
| WO | 2007/088736 A1 | 8/2007 |
| WO | 2015/076250 A1 | 5/2015 |

OTHER PUBLICATIONS

Mar. 6, 2018 Office Action issued in Japanese Patent Application No. 2017-184697.

* cited by examiner

*Primary Examiner* — William K Cheung
(74) *Attorney, Agent, or Firm* — Oliff PLC

(57) ABSTRACT

A resin composition includes a cellulose ester compound (A); polylactic acid (B); and a poly(meth)acrylate-based compound (C) having a weight-average molecular weight (Mw) of less than 50,000.

12 Claims, No Drawings

RESIN COMPOSITION AND RESIN MOLDED ARTICLE THEREOF

CROSS-REFERENCE TO RELATED APPLICATIONS

This application is based on and claims priority under 35 USC 119 from Japanese Patent Application No. 2017-184697 filed Sep. 26, 2017.

BACKGROUND

(i) Technical Field

The present invention relates to a resin composition and a resin molded article thereof.

(ii) Related Art

Various resin compositions have been proposed and used for various applications. In particular, resin compositions are used for various parts, housings, etc. of home electric appliances, automobiles, and the like. In addition, thermoplastic resins are used for parts such as housings and the like of office equipment, electronic/electric equipment, and the like.

In recent years, plant-derived resins have been used, and one of the plant-derived resins which have been known is a cellulose ester compound.

SUMMARY

According to an aspect of the invention, there is provided a resin composition containing a cellulose ester compound (A), polylactic acid (B), and a poly(meth)acrylate-based compound (C) having a weight-average molecular weight (Mw) of less than 50,000.

DETAILED DESCRIPTION

An exemplary embodiment of the invention is described below.

In the specification of the invention, when plural materials corresponding to each component are present in an object, the amount of each component in the object represents the total content or amount of the plural materials present in the object unless otherwise specified.

The description "polymer of A" is an expression including a copolymer of A and a monomer other than A in addition to a homopolymer of A alone. Similarly, the description "copolymer of A and B" is an expression including a copolymer of A, B, and a monomer other than A and B in addition to a copolymer of A and B alone (for convenience, referred to as a "homocopolymer" hereinafter).

In addition, a cellulose ester compound (A), polylactic acid (B), and a poly(meth)acrylate-based compound (C) are also referred to as a "component (A)", a "component (B)", and a "component (C)", respectively.

—Resin Composition—

A resin composition according to an exemplary embodiment of the invention contains a cellulose ester compound (A), polylactic acid (B), and a poly(meth)acrylate-based compound (C) having a weight-average molecular weight (Mw) of less than 50,000. The resin composition according to the exemplary embodiment may further contain other components.

The cellulose ester compound (A) (particularly, cellulose acylate having hydroxyl groups partially substituted by acyl groups) is derived from non-edible resources and is a first derivative not requiring chemical polymerization, and thus it is an environmentally friendly resin material. Also, the cellulose ester compound (A) has a high elastic modulus as a resin material and further has a high transparency property.

On the other hand, the cellulose ester compound (A) tends to be fragile due to its low impact resistance. In particular, a resin molded article molded by using a resin composition containing the cellulose ester compound (A) tends to have low surface-impact resistance. Although the factor for the low surface-impact resistance is unclear, it is supposed as follows.

When the resin composition containing the cellulose ester compound (A) having the property that molecular chains are easily oriented is molten by a method such as injection molding or the like, the molecular chains are easily oriented along the extrusion direction. Also, the resin composition containing the cellulose ester compound (A), the polylactic acid (B), and the poly(meth)acrylate-based compound (C) tends to have a high melt viscosity during molding. In particular, the cellulose ester compound (A) and the poly(meth)acrylate-based compound (C) have a high melt viscosity. Therefore, the molecular chains hardly move during molding, and molding may be performed in a state where the molecular chains are oriented. A resin molded article molded in the state where the molecular chains are oriented is easily broken along the orientation direction of the molecular chains. Therefore, the surface-impact resistance of the resin molded article is easily decreased.

However, the resin composition according to the exemplary embodiment contains the cellulose ester compound (A), the polylactic acid (B), and the poly(meth)acrylate-based compound (C), and the weight-average molecular weight (Mw) of the poly(meth)acrylate-based compound (C) is suppressed to less than 50,000. It is thus possible to produce a resin molded article having excellent surface-impact resistance while suppressing a decrease in transparency. This function is supposed as follows.

When the weight-average molecular weight (Mw) of the poly(meth)acrylate-based compound (C) is suppressed to less than 50,000, the melt viscosity of the resin composition during molding is decreased. Also, intermolecular entanglement of the poly(meth)acrylate-based compound (C) is easily loosened. When in a state where intermolecular entanglement of the poly(meth)acrylate-based compound (C) is easily loosened, the poly(meth)acrylate-based compound (C) is dispersed in the resin composition having low melt viscosity, the resin composition extruded in a direction by injection molding or the like is easily brought from the state where the molecular chains are oriented into a state where the molecular chains are disordered. Then, the resin molded article is molded in the state where the molecular chains are disordered. As a result, the resultant resin molded article is hard to break along the orientation direction of the molecular chains and has excellent surface-impact resistance because the molecular chains are in the disordered orientation state.

Next, the reason why transparency is decreased is supposed as follows. The polylactic acid (B) (referred to as the "component (B)" hereinafter) and the poly(meth)acrylate-based compound (C) (referred to as the "component (C)" hereinafter) have high compatibility with the cellulose ester compound (A) (referred to as the "component (A)" hereinafter), but when being mixed, they are not completely compatible with each other. Therefore, when the component (A) is mixed with the component (B), a phase of the component (A) (referred to as a "(A) phase" hereinafter) and a phase of the component (B) are formed. Similarly, when the component (A) is mixed with the component (C), a (A) phase and a phase of the component (C) are formed. Thus, the transparency of a mixture (that is, the resin composition) of the components tends to be decreased due to a difference in refractive index between the components.

On the other than, the refractive indexes of the component (C), the component (A), and the component (B) increase in that order. That is, the refractive index of the component (C) is lower than that of the component (A), and the refractive index of the component (B) is higher than that of the component (A). In addition, compatibility of the component (B) with the component (C) is higher than that with the component (A), and thus when the component (A), the component (B), and the component (C) are mixed, the (A) phase and a phase (also referred to as a "(B+C) phase" hereinafter) in which the component (B) and the component (C) are compatible with each other are formed. Therefore, the component (B) and the component (C) which have a large difference in refractive index form the (B+C) phase, and thus the refractive index of the (B+C) phase comes close to the refractive index of the (A) phase (that is, the component (A)). Consequently, a decrease in transparency of the mixture of the component (A), the component (B), and the component (C) (that is, the resin composition) is suppressed.

The components of the resin composition according to the exemplary embodiment are described in detail below.

[Cellulose Ester Compound (A): Component (A)]

The cellulose ester compound (A) is, for example, a resin of a cellulose derivative (cellulose acylate) in which hydroxyl groups of cellulose are at least partially substituted (acylated) by acyl groups. Specifically, the cellulose ester compound (A) is, for example, a cellulose derivative represented by a general formula (CE).

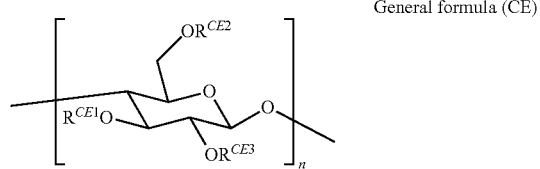

General formula (CE)

In the general formula (CE), $R^{CE1}$, $R^{CE2}$, and $R^{CE3}$ each independently represent a hydrogen atom or an acyl group, and n represents an integer of 2 or more. However, at least some of n $R^{CE1}$ groups, n $R^{CE2}$ groups, and n $R^{CE3}$ groups represent acyl groups.

In addition, an acyl group represented by each of $R^{CE1}$, $R^{CE2}$, and $R^{CE3}$ is preferably an acyl group having 1 or more and 6 or less carbon atoms.

In the general formula (CE), the range of n is not particularly limited, but n is preferably 200 or more and 1000 or less and more preferably 500 or more and 1000 or less.

In the general formula (CE), the expression "$R^{CE1}$, $R^{CE2}$, and $R^{CE3}$ each independently represent an acyl group" represents that at least some of hydroxyl groups of a cellulose derivative represented by the general formula (CE) are acylated.

That is, n $R^{CE1}$ groups in the molecule of the cellulose derivative represented by the general formula (CE) may be all the same, partially the same, or different from each other.

Similarly, n groups of each of $R^{CE2}$ and $R^{CE3}$ may be all the same, partially the same, or different from each other.

The cellulose ester compound (A) preferably has an acyl group having 1 or more and 6 or less carbon atoms. In this case, the resin composition is easily produced, which provides a resin molded article having excellent surface-impact resistance while suppressing a decrease in transparency as compared with a case having an acyl group having 7 or more carbon atoms.

An acyl group is represented by the structure of "—CO—$R^{AC}$" wherein $R^{AC}$ represents a hydrogen atom or a hydrocarbon group (more preferably a hydrocarbon group having 1 or more and 5 or less carbon atoms).

A hydrocarbon group represented by $R^{AC}$ may be linear, branched, or cyclic, but is preferably linear.

A hydrocarbon group represented by $R^{AC}$ may be either a saturated hydrocarbon group or an unsaturated hydrocarbon group, but is preferably a saturated hydrocarbon group.

A hydrocarbon group represented by $R^{AC}$ may have an atom (for example, oxygen, nitrogen, or the like) other than carbon and hydrogen, but is preferably a hydrocarbon group having only carbon and hydrogen.

Examples of the acyl group include a formyl group, an acetyl group, a propionyl group, a butyryl group (butanoyl group), a propenoyl group, a hexanoyl group, and the like.

Among these, from the viewpoint of improving moldability of the resin composition and suppressing a decrease in transparency of, and improving surface-impact resistance of, the resultant resin composition, the acyl group is preferably an acyl group having 2 or more and 4 or less carbon atoms and more preferably an acyl group having 2 or more and 3 or less carbon atoms.

Examples of the cellulose ester compound (A) include cellulose acetate (cellulose monoacetate, cellulose diacetate (DAC), and cellulose triacetate), cellulose acetate propionate (CAP), cellulose acetate butyrate (CAB), and the like.

These cellulose ester compounds (A) may be used alone or in combination of two or more.

Among these examples of the cellulose ester compound (A), from the viewpoint of suppressing a decrease in transparency of, and improving surface-impact resistance of, the resultant resin molded article, cellulose acetate propionate (CAP) and cellulose acetate butyrate (CAB) are preferred and cellulose acetate propionate (CAP) is more preferred.

From the viewpoint of improving moldability of the resin composition and suppressing a decrease in transparency of, and improving surface-impact resistance of, the resultant resin molded article, the weight-average polymerization degree of the cellulose ester compound (A) is preferably 200 or more and 1000 or less and more preferably 500 or more and 1000 or less.

The weight-average polymerization degree is determined from the weight-average molecular weight (Mw) according to the following procedures.

First, the weight-average molecular weight (Mw) of the cellulose ester compound (A) is measured in terms of polystyrene by using a gel permeation chromatography apparatus (GPC apparatus: HLC-8320GPC manufactured by Tosoh Corporation, column: TSK gel α-M) using tetrahydrofuran.

Next, the weight-average polymerization degree of the cellulose ester compound (A) is determined by dividing by the molecular weight of the constituent unit of the cellulose ester compound (A). When a substituent of cellulose acylate is an acetyl group, the molecular weight of the constituent unit with a degree of substitution of 2.4 is 263 and that with a degree of substitution of 2.9 is 284.

From the viewpoint of improving moldability of the resin composition and suppressing a decrease in transparency of, and improving surface-impact resistance of, the resultant resin molded article, the degree of substitution of the cellulose ester compound (A) is preferably 2.1 or more and 2.8 or less, more preferably 2.2 or more and 2.8 or less, still more preferably 2.3 or more and 2.75 or less, and particularly preferably 2.35 or more and 2.75 or less.

From the viewpoint of improving moldability of the resin composition and suppressing a decrease in transparency of, and improving surface-impact resistance of, the resultant resin molded article, the ratio (acetyl group/propionyl group) of a degree of substitution with an acetyl group to a degree of substitution with a propionyl group in the cellulose acetate propionate (CAP) is preferably 5/1 or more and 1/20 or less and more preferably 3/1 or more and 1/15 or less.

From the viewpoint of improving moldability of the resin composition and suppressing a decrease in transparency of, and improving surface-impact resistance of, the resultant resin molded article, the ratio (acetyl group/butyryl group) of a degree of substitution with an acetyl group to a degree of substitution with a butyryl group in the cellulose acetate butyrate (CAB) is preferably 5/1 or more and 1/20 or less and more preferably 4/1 or more and 1/15 or less.

The degree of substitution is an index indicating the degree to which the hydroxyl groups possessed by cellulose are substituted with acyl groups. That is, the degree of substitution becomes an index indicating the degree of acylation of the cellulose ester compound (A). Specifically, the degree of substitution represents an intramolecular average of the number of acryl groups as substituents for the three hydroxyl groups present in a D-glucopyranose unit of cellulose acylate.

The degree of substitution is determined from an integration ratio between a peak of cellulose-derived hydrogen and a peak derived from acyl groups in $H^1$-NMR (JMN-ECA/ manufactured by JEOL RESONANCE Inc.).

[Polylactic Acid (B): Component (B)]

The polylactic acid (B) according to the exemplary embodiment is a polymer compound in which lactic acid is polymerized by an ester bond.

Examples of the polylactic acid (B) include a L-lactic acid homopolymer, a D-lactic acid homopolymer, a block copolymer containing at least one of L-lactic acid and D-lactic acid polymers, and a graft copolymer containing at least one of L-lactic acid and D-lactic acid polymers.

Examples of a compound copolymerizable with L-lactic acid or D-lactic acid include polyvalent carboxylic acids and anhydrides thereof, such as glycolic acid, dimethylglycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, 4-hydroxyvaleric acid, oxalic acid, malonic acid, succinic acid, glutaric acid, adipic acid, pimelic acid, azelaic acid, sebacic acid, undecanedioic acid, dodecanedioic acid, terephthalic acid, and the like; polyhydric alcohols such as ethylene glycol, diethylene glycol, triethylene glycol, 1,2-propanediol, 1,3-propoanediol, 1,3-butanediol, 1,4-butanediol, 2,3-butanediol, 1,5-pentanediol, 1,6-hexanediol, 1,9-nonanediol, 3-methyl-1,5-pentanediol, neopentyl glycol, tetramethylene glycol, 1,4-hexanedimethanol, and the like; polysaccharides such as cellulose and the like; aminocarboxylic acids such as α-amino acid and the like; hydroxycarboxylic acids such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethylcaproic acid, mandelic acid, and the like; cyclic esters such as glycoride, β-methyl-δ-valerolactone, γ-valerolactone, ε-caprolactone, and the like; and the like.

It is known that the polylactic acid can be produced by a lactide method through a lactide, a direct polymerization method of heating lactic acid in a solvent under reduced pressure and then polymerizing lactic acid while removing water, or the like.

The "copolymer of L-lactic acid or D-lactic acid with a compound copolymerizable with L-lactic acid or D-lactic acid" is, for example, a block copolymer or graft copolymer having a polylactic acid sequence capable of producing a helical crystal.

A polylactic acid-based polymer can be produced by, for example, a method of direct dehydration condensation of lactic acid described in Japanese Unexamined Patent Application Publication Nos. 59-096123 and 7-033861, a method of ring-opening polymerization using lactide which is a lactic acid dimer described in U.S. Pat. Nos. 2,668,182 and 4,057,357, or the like.

In order that the optical purity of the polylactic acid-based polymer produced by each of the production methods is adjusted to 95.00% ee or more, for example, when polylactic acid is produced by the lactide method, it is preferred to polymerize lactide having an optical purity improved to 95.00% ee or more by a crystallization operation.

From the viewpoint of suppressing a decrease in transparency of, and improving surface-impact resistance of, the resultant resin molded article, the weight-average molecular weight (Mw) of the polylactic acid (B) is preferably 50,000 or more and 300,000 or less, more preferably 75,000 or more and 250,000 or less, and still more preferably 100,000 or more and 200,000 or less.

From the viewpoint of suppressing a decrease in transparency of, and improving surface-impact resistance of, the resultant resin molded article, the weight-average polymerization degree of the polylactic acid (B) is preferably 700 or more and 4200 or less and more preferably 1400 or more and 2800 or less.

The weight-average molecular weight (Mw) of the polylactic acid (B) is a value measured by gel permeation chromatography (GPC). Specifically, the molecular weight is measured by GPC using a measurement apparatus, HPLC 1100 manufactured by Tosoh Corporation; a column, TSK gel GMHHR-M+TSK gel GMHHR-M (7.8 mm I.D. 30 cm) manufactured by Tosoh Corporation; and chloroform as a solvent. The weight-average molecular weight (Mw) is calculated from the measurement result by using a molecular weight calibration curve formed by a monodisperse polystyrene standard sample.

[Poly(Meth)Acrylate-Based Compound (C) having Weight-Average Molecular weight of Less than 50,000: Component (C)]

The poly(meth)acrylate-based compound (C) according to the exemplary embodiment is a compound (resin) having a constituent unit derived from a (meth)acrylic acid ester (preferably a (meth)acrylic acid alkyl ester). The poly(meth)acrylate-based compound (C) may be a compound (resin) having a constituent unit derived from a monomer other than the (meth)acrylic acid ester.

The constituent unit (unit derived from a monomer) possessed by the poly(meth)acrylate-based compound (C) may include only one unit or two or more units.

From the viewpoint of suppressing a decrease in transparency of, and improving surface-impact resistance of, the resultant resin molded article, the poly(meth)acrylate-based compound (C) is preferably a compound (polymer) containing 50% by mass or more (preferably 70% by mass or more, more preferably 90% by mass, and still more preferably 100% by mass) of the constituent unit derived from the (meth)acrylic acid alkyl ester.

Examples of the (meth)acrylic acid alkyl ester in the poly(meth)acrylate-based compound (C) include methyl (meth) acrylate, ethyl (meth) acrylate, n-propyl (meth) acrylate, n-butyl (meth) acrylate, n-pentyl (meth) acrylate, n-hexyl (meth) acrylate, n-heptyl (meth) acrylate, n-octyl (meth) acrylate, n-decyl (meth)acrylate, isopropyl (meth) acrylate, isobutyl (meth) acrylate, tert-butyl (meth) acrylate, isopentyl (meth)acrylate, amyl (meth)acrylate, neopentyl (meth)acrylate, isohexyl (meth)acrylate, isoheptyl (meth) acrylate, isooctyl (meth) acrylate, 2-ethylhexyl (meth)acrylate, octyl (meth)acrylate, decyl (meth)acrylate, cyclohexyl (meth) acrylate, dicyclopentanyl (meth) acrylate, and the like.

The poly(meth)acrylate-based compound (C) is preferably a polymer containing 50% by mass or more (preferably 70% by mass or more, more preferably 90% by mass, and still more preferably 100% by mass) of the constituent unit derived from a (meth)acrylic acid alkyl ester having an alkyl chain having 1 or more and 8 or less carbon atoms (preferably 1 or more and 4 or less, more preferably 1 or more and 2 or less, and still more preferably 1).

When the poly(meth)acrylate-based compound (C) has a short alkyl chain having a small number of carbon atoms, the SP value of the poly(meth)acrylate-based compound (C) is close to that of the polylactic acid (B), and thus compatibility between the poly(meth)acrylate-based compound (C) and the polylactic acid (B) is improved, thereby improving haze. Therefore, the resin composition which produces a resin molded article with suppressed decrease in transparency can be easily produced.

The poly(meth)acrylate-based compound (C) is preferably a polymer having 100% by mass of a constituent unit derived from a (meth)acrylic acid alkyl ester having an alkyl chain having 1 or more and 8 or less carbon atoms (preferably 1 or more and 4 or less, more preferably 1 or more and 2 or less, and still more preferably 1). That is, the poly(meth)acrylate-based compound (C) is preferably a poly(meth) acrylic acid alkyl ester having an alkyl chain having 1 or more and 8 or less carbon atoms (preferably 1 or more and 4 or less, more preferably 1 or more and 2 or less, and still more preferably 1). The poly(meth)acrylic acid alkyl ester having an alkyl chain having 1 carbon atom is preferably polymethyl methacrylate.

Examples of a monomer other than the (meth)acrylic acid ester in the poly(meth)acrylate-based compound (C) include styrenes [monomers having a styrene skeleton, such as styrene, alkyl-substituted styrene (for example, α-methylstyrene, 2-methylstyrene, 3-methylstyrene, 4-methylstyrene, 2-ethylstyrene, 3-ethylstyrene, 4-ethylstyrene, and the like), halogen-substituted styrene (for example, 2-chlorostyrene, 3-chlorostyrene, 4-chlorostyrene, and the like), vinylnaphthalene (2-vinylnaphthalene and the like), hydorxystyrene (4-ethenylphenol and the like), and the like], carboxylic anhydrides [monomers having a carboxylic anhydride skeleton such as maleic anhydride, itaconic anhydride, and the like], and the like.

From the viewpoint of suppressing a decrease in transparency of, and improving surface-impact resistance of, the resultant resin molded article, the weight-average molecular weight (Mw) of the poly(meth)acrylate-based compound (C) is less than 50,000, preferably 15,000 or more and less than 50,000, more preferably 20,000 or more and less than 50,000, and still more preferably 25,000 or more and less than 50,000.

When the weight-average molecular weight (Mw) of the poly(meth)acrylate-based compound (C) is less than 50,000, the resin composition which provides a resin molded article having excellent surface-impact resistance can be produced.

The weight-average molecular weight (Mw) of the polymethyl methacrylate is a value measured by gel permeation chromatography (GPC). Specifically, the molecular weight is measured by GPC using a measurement apparatus, HLC-8320GPC manufactured by Tosoh Corporation; a column, TSK gel α-M manufactured by Tosoh Corporation; and tetrahydrofuran as a solvent. The weight-average molecular weight (Mw) is calculated from the measurement result by using a molecular weight calibration curve formed by a monodisperse polystyrene standard sample.

[Content or Mass Ratio of Component (A) to Component (C)]

The content or mass ratio of each of the components is described. From the viewpoint of suppressing a decrease in transparency of, and improving surface-impact resistance of, the resultant resin molded article, the content or mass ratio of each of the components is preferably within a range below. Abbreviations of the components are as follows.

Component (A)=cellulose ester compound (A)
Component (B)=polylactic acid (B)
Component (C)=poly(meth)acrylate-based compound (C)

The mass ratio [(A)/((A)+(B)+(C))] of the component (A) to the total of the component (A), the component (B), and the component (C) is preferably 0.5 or more and 0.96 or less, more preferably 0.75 or more and 0.93 or less, and still more preferably 0.8 or more and 0.9 or less.

The mass ratio [(B)/((A)+(B)+(C))] of the component (B) to the total of the component (A), the component (B), and the component (C) is preferably 0.02 or more and 0.35 or less, more preferably 0.035 or more and 0.25 or less, and still more preferably 0.055 or more and 0.15 or less.

The mass ratio [(C)/((A)+(B)+(C))] of the component (C) to the total of the component (A), the component (B), and the component (C) is preferably 0.02 or more and 0.35 or less, more preferably 0.035 or more and 0.25 or less, and still more preferably 0.055 or more and 0.15 or less.

From the viewpoint of suppressing a decrease in transparency of, and improving surface-impact resistance of, the resultant resin molded article, the content of the component (A) in the resin composition is preferably 45% by mass or more, more preferably 50% by mass or more, and still more preferably 65% by mass or more.

In particular, when the content of the cellulose ester compound (A) in the resin composition is 50% by mass or more, the resin composition which produces a resin molded article having excellent tensile break strain can be easily produced as compared with the case where the content of the cellulose ester compound (A) is less than 50% by mass.

The mass ratio of the component (C) to the total of the component (B) and the component (C) is 0.25 or more and 0.75 or less, preferably 0.3 or more and 0.7 or less, and more preferably 0.4 or more and 0.6 or less.

In particular, when mass ratio of the poly(meth)acrylate-based compound (C) to the total of the polylactic acid (B) and the poly(meth)acrylate-based compound (C) is 0.3 or more and 0.7 or less, the resin composition which produces a resin molded article having excellent surface-impact resistance while suppressing a decrease in transparency can be easily produced.

The total mass ratio of the component (B) and the component (C) to the component (A) is 0.03 or more and less than 1, preferably 0.05 or more and less than 1, and more preferably 0.1 or more and 0.5 or less.

When total mass ratio of the polylactic acid (B) and the poly(meth)acrylate-based compound (C) to the cellulose ester compound (A) is 0.05 or more, the resin composition which produces a resin molded article having excellent surface-impact resistance can be provided. While when the total mass ratio of the polylactic acid (B) and the poly(meth) acrylate-based compound (C) to the cellulose ester compound (A) is less than 1, the resin composition which produces a resin molded article having suppressed decrease in transparency can be easily produced.

[Other components]

The resin composition according to the exemplary embodiment may contain a plasticizer and a thermoplastic elastomer.

(Plasticizer)

Examples of the plasticizer include an adipic acid ester-containing compound, a polyether ester compound, a sebacic acid ester compounds, a glycol ester compound, an acetic acid ester, a dibasic acid ester compound, a phosphoric acid ester compound, a phthalic acid ester compound, camphor, a citric acid ester, a stearic acid ester, a metal soap, a polyol, a polyalkylene oxide, and the like. Among these, the adipic acid ester-containing compound and the polyether ester compound are preferred, and the adipic acid ester-containing compound is more preferred.

The content of the plasticizer is preferably such that the ratio of a specific cellulose derivative in the whole of the resin composition is within the range described above. More specifically, the ratio of the plasticizer in the whole of the resin composition is preferably 15% by mass or less, more preferably 10% by mass or less, and still more preferably 5% by mass or less. With the ratio of the plasticizer within the range, elastic modulus is further increased, and heat resistance is further increased. Also, bleeding of the plasticizer is suppressed.

(Thermoplastic Elastomer)

The thermoplastic elastomer is, for example, an elastomer having rubber properties at room temperature (25° C.) and the property of softening at a high temperature like thermoplastic resins. Examples of the thermoplastic elastomer include a (meth)acrylic thermoplastic elastomer, a styrene-based thermoplastic elastomer, and the like.

The (meth)acrylic thermoplastic elastomer is, for example, a polymer of two or more (meth)acrylic acid alkyl esters, a polymer of an olefin and (meth)acrylic acid alkyl ester, or the like. Specific examples thereof include polymethyl methacrylate-poly n-butyl acrylate)-polymethyl methacrylate block copolymer, polymethyl methacrylate-polydodecyl methacrylate-polymethyl methacrylate block copolymer, polymethyl methacrylate-poly 2-ethylhexyl methacrylate-polymethyl methacrylate block copolymer, polymethyl methacrylate-polylauryl methacrylate-polymethyl methacrylate block copolymer, ethylene-methyl acrylate block copolymer, and the like.

The styrene-based thermoplastic elastomer is, for example, a copolymer of styrene (monomer having a styrene skeleton) and an olefin, a copolymer of styrene and conjugated diene, a copolymer of styrene, conjugated diene, and olefin, or the like. Specific examples thereof include polystyrene-polybutadiene-polystyrene block copolymer, poly-styrene-polybutadiene-polybutylene-polystyrene block copolymer, polystyrene-polyethylene-polybutylene-polystyrene block copolymer, polystyrene-polyisoprene-polystyrene block copolymer, polystyrene-hydrogenated polybutadiene-polystyrene block copolymer, polystyrene-hydrogenated polyisoprene-polystyrene block copolymer, polystyrene-polyisoprene-hydrogenated butadiene-polystyrene block copolymer, and the like.

The content of the thermoplastic elastomer is preferably 3% by mass or more and 30% by mass or less relative to the resin composition.

(Components other than Plasticizer and Thermoplastic Elastomer)

The resin composition according to the exemplary embodiment may contain components other than the plasticizer and the thermoplastic elastomer described above. Examples of the other components include a flame retardant, a compatibilizer, an antioxidant, a mold release agent, a light resistant agent, a weathering agent, a coloring agent, a pigment, a modifier, an anti-drip agent, an antistatic agent, a hydrolysis resistant agent, a filler, a reinforcing agent (glass fiber, carbon fibers, talc, clay, mica, glass flake, milled glass, glass beads, crystalline silica, alumina, silicon nitride, aluminum nitride, boron nitride, or the like), and the like.

If required, components (additives) such as an acid acceptor for preventing acetic acid release, a reactive trap agent, and the like may be added. Examples of the acid acceptor include oxides such as magnesium oxide, aluminum oxide, and the like; metal hydroxides such as magnesium hydroxide, calcium hydroxide, aluminum hydroxide, hydrotalcite, and the like; calcium carbonate; talc; and the like.

Examples of the reactive trap agent include an epoxy compound, an acid anhydride compound, carbodiimide, and the like.

The content of each of the components is preferably 0% by mass or more and 5% by mass or less relative to the total amount of the resin composition. The content "0% by mass" represents not containing the other component.

The resin composition according to the exemplary embodiment may contain a resin other than the resins (the cellulose ester compound (A), the polylactic acid (B), and the poly(meth)acrylate-based compound (C)) described above. However, when the other resin is contained, the content of the other resin is preferably 5% by mass or less and more preferably less than 1% by mass relative to the total amount of the resin composition. The other resin is more preferably not contained (that is, 0% by mass).

The other resin is, for example, a general known thermoplastic resin. Specific examples thereof include polycarbonate resins; polypropylene resins; polyester resins; polyolefin resins; polyester carbonate resins; polyphenylene ether resins; polyphenylene sulfide resins; polysulfone resins; polyether sulfone resins; polyarylene resins; polyetherimide resins; polyacetal resins; polyvinylacetal resins; polyketone resins; polyether ketone resins; polyether ether ketone resins; polyaryl ketone resins; polyether nitrile resins; liquid crystal resins; polybenzimidazole resins; polyparabanic acid resins; vinyl polymers or copolymers produced by polymerizing or copolymerizing one or more vinyl monomers selected from the group consisting of aromatic alkenyl compounds, methacrylic acid esters, acrylic acid esters, and vinyl cyanide compounds; diene-aromatic alkenyl compound copolymers; vinyl cyanide-diene-aromatic alkenyl compound copolymers; aromatic alkenyl compound-diene-vinyl cyanide-N-phenylmaleimide copolymers; vinyl cyanide-(ethylene-diene-propylene (EPDM))-aromatic alkenyl compound copolymers; vinyl chloride resins; chlorinated vinyl chloride resins; and the like. These resins may be used alone or in combination of two or more.

[Method for Producing Resin Composition]

A method for producing the resin composition according to the exemplary embodiment includes, for example, preparing a resin composition containing the cellulose ester compound (A), the polylactic acid (B), and the poly(meth)acrylate-based compound (C) having a weight-average molecular weight of less than 50,000. The resin composition according to the exemplary embodiment is produced by melt-kneading a mixture containing the cellulose ester compound (A), the polylactic acid (B), and the poly(meth)acrylate-based compound (C) having a weight-average molecular weight of less than 50,000, and if required, other components. Also, the resin composition according to the exemplary embodiment is produced by, for example, dissolving the components in a solvent.

A known method can be used as a melt-kneading method. Specific examples thereof include a twin-screw extruder, a Henschel mixer, a Banbury mixer, a mono-screw extruder, a multi-screw extruder, a co-kneader, and the like.

—Resin molded article—

A resin molded article according to an exemplary embodiment contains the resin composition according to the exemplary embodiment. That is, the resin molded article according to the exemplary embodiment is made of the same composition as the resin composition according to the exemplary embodiment.

In view of a high degree of shape freedom, a method for molding the resin molded article according to the exemplary embodiment is preferably injection molding. In view of this point, the resin molded article is an injected molded article produced by injection molding.

The cylinder temperature of injection molding is, for example, 160° C. or more and 280° or less and preferably 180° C. or more and 260° C. or less. The mold temperature of injection molding is, for example, 40° C. or more and 90° or less and preferably 60° C. or more and 80° C. or less.

Injection molding may be performed by using a commercial apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., PNX40 manufactured by Nissei Plastic Industrial Co., Ltd., SE50D manufactured by Sumitomo Heavy Industries, Ltd., and the like.

The method for molding the resin molded article according to the exemplary embodiment is not limited to the injection molding and, for example, extrusion molding, blow molding, hot press molding, calender molding, coating molding, cast molding, dipping molding, vacuum molding, transfer molding, or the like may be applied.

When the resin molded article according to the exemplary embodiment has a thickness of 2 mm, the haze value thereof is 10% or less (preferably 7% or less). When the resin molded article having a thickness of 2 mm has a haze value of 10% or less, the resin molded article is considered to have transparency.

The ideal value of the haze value of the resin molded articles is 0%, but the haze value is preferably 0.5% or more from the viewpoint of production.

The haze value of the resin molded article is a value measured by a method described in examples.

The resin molded article according to the exemplary embodiment is preferably used for applications such as electronic/electric equipment, office equipment, home electric appliances, automobile interior materials, toys, containers, etc. Specific examples thereof include housings of electronic/electric equipment and home electric appliances, various parts of electronic/electric equipment and home electric appliances, interior parts of automobiles, block assembly toys, plastic model kits, housing cases of CD-ROM, DVD, and the like, tableware, drink bottles, food trays, wrapping materials, films, sheets, and the like.

EXAMPLE

The present invention is described in further detail below on the basis of examples, but the present invention is not limited to the examples below. In addition, "parts" represents "parts by mass" unless otherwise specified.

[Preparation of Materials]

Materials described below are prepared.

—Preparation of Cellulose Ester Compound (A)—
CE1: cellulose acetate propionate
(CAP482-20 manufactured by EASTMAN CHEMICAL COMPANY)
CE2: cellulose acetate butyrate
(CAB171-15 manufactured by EASTMAN CHEMICAL COMPANY)
CE3: cellulose acetate butyrate
(CAB381-20 manufactured by EASTMAN CHEMICAL COMPANY)
CE4: cellulose acetate butyrate
(CAB500-5 manufactured by EASTMAN CHEMICAL COMPANY)
CE5: cellulose diacetate (DAC)
(L-50 manufactured by Daicel Corporation)

The degrees of substitution of the cellulose ester compounds are shown in Table 1. In the table, DPw represents the weight-average polymerization degree, DS(Ac), DS(Pr), DS(Bt) represent the degrees of substitution of an acetyl group, a propionyl group, a butyryl group, respectively.

TABLE 1

| Type of cellulose ester compound (A) | DPw | DS(Ac) | DS(Pr) | DS(Bt) |
|---|---|---|---|---|
| CE1 | 716 | 0.18 | 2.49 | — |
| CE2 | 754 | 2.07 | — | 0.73 |
| CE3 | 890 | 1.05 | — | 1.74 |
| CE4 | 625 | 0.17 | — | 2.64 |
| CE5 | 570 | 2.45 | — | — |

—Preparation of Polylactic Acid (B)—
B1: polylactic acid resin
(Ingeo biopolymer 3001D manufactured by Nature Works)

—Preparation of Poly(Meth)Acrylate-Based Compound (C)—
C1: polymethyl methacrylate resin
(Delpowder 500V manufactured by Asahi Kasei Corporation, weight-average molecular weight: 25,000)
C2: polymethyl methacrylate resin
(Sumipex MHF manufactured by Sumitomo Chemical Co., Ltd., weight-average molecular weight: 95,000)

—Preparation of Plasticizer—
PL1: adipic acid ester mixture
(Daifatty 101 manufactured by Daihachi Chemical Industry Co., Ltd.)

Examples 1 to 15 and Comparative Examples 1 to 4

—Kneading and Injection Molding—

A resin composition (pellets) is prepared by kneading using a twin-screw kneader (LTE20-44 manufactured by Labtech Engineering Co., Ltd.) at a charging composition ratio shown in Table 2 and a cylinder temperature shown in Table 2.

The resultant pellets are molded into resin molded articles (1) and (2) below by using an injection molding machine (NEX500I manufactured by Nissei Plastic Industrial Co., Ltd.) at an injection peak pressure not exceeding 180 MPa, a cylinder temperature shown in Table 2, and a mold temperature of 60° C.

(1): A D2 specimen (dimensions 60 mm×60 mm, thickness 2 mm) is molded.

(2): An ISO multi-purpose dumbbell (measurement part of 10 mm in width and 4 mm in thickness) is molded.

[Evaluation]

The obtained molded articles and pellets are evaluated as follows. The evaluation results are shown in Table 2.

—Screw Squeal—

The resultant pellets are plasticized by using an injection molding machine (NEX500I manufactured by Nissei Plastic Industrial Co., Ltd.) at a cylinder temperature shown in Table 2, a mold temperature of 60° C., a number of screw rotations of 100 rpm, and a back pressure of 15 MPa. When a high-pitched squeal noise is generated during plasticization, the evaluation result is "Yes", while when no noise is generated, the evaluation result is "No".

—Tensile Break Strain and Tensile Elastic Modulus—

The tensile break strain and tensile elastic modulus of the resultant ISO multi-purpose dumbbell are measured by a method according to ISO527 using a universal tester (Autograph AG-Xplus manufactured by Shimadzu Corporation).

—Surface-Impact Strength (Resistance to Steel-Ball Drop)—

A steel ball having a diameter of 50 mm and a mass of 500 g is dropped and collided to the resultant D2 specimen from a height of each of 0.2, 0.4, 0.6, 0.8, and 1.0 m. This test is performed three times at each of the drop heights. The height at which a portion of the square plate is completely broken into plural broken pieces two or more times is evaluated as resistance to steel-ball drop.

—Haze value—

The haze value of the resultant D2 specimen is measured by using a haze meter (NDH200 manufactured by Nippon Denshoku Industries Co., Ltd.).

TABLE 2

|  | Type and content (parts) of component (A) | Type and content (parts) of component (B) | Type and content (parts) of component (C) | (C)/(B + C) | (B + C)/(A) | Plasticizer |
|---|---|---|---|---|---|---|
| Example 1 | CE1 = 100 | B1 = 5 | C1 = 5 | 0.5 | 0.1 | — |
| Example 2 | CE1 = 100 | B1 = 12.5 | C1 = 12.5 | 0.5 | 0.25 | — |
| Comparative Example 1 | CE1 = 80 | B1 = 10 | C2 = 10 | 0.5 | 0.25 | — |
| Example 3 | CE1 = 100 | B1 = 3 | C1 = 3 | 0.5 | 0.06 | — |
| Example 4 | CE1 = 100 | B1 = 45 | C1 = 45 | 0.5 | 0.9 | — |
| Example 5 | CE1 = 100 | B1 = 2 | C1 = 2 | 0.5 | 0.04 | — |
| Example 6 | CE1 = 100 | B1 = 55 | C1 = 55 | 0.5 | 1.1 | — |
| Comparative Example 2 | CE1 = 40 | B1 = 30 | C2 = 30 | 0.5 | 1.5 | — |
| Example 7 | CE1 = 100 | B1 = 3.5 | C1 = 6.5 | 0.65 | 0.1 | — |
| Example 8 | CE1 = 100 | B1 = 6.5 | C1 = 3.5 | 0.35 | 0.1 | — |
| Example 9 | CE1 = 100 | B1 = 2.5 | C1 = 7.5 | 0.75 | 0.1 | — |
| Example 10 | CE1 = 100 | B1 = 7.5 | C1 = 2.5 | 0.25 | 0.1 | — |
| Comparative Example 3 | CE1 = 100 | B1 = 3.5 | C2 = 6.5 | 0.65 | 0.1 | — |
| Comparative Example 4 | CE1 = 100 | B1 = 6.5 | C2 = 3.5 | 0.35 | 0.1 | — |
| Example 11 | CE2 = 100 | B1 = 5 | C1 = 5 | 0.5 | 0.1 | — |
| Example 12 | CE3 = 100 | B1 = 5 | C1 = 5 | 0.5 | 0.1 | — |
| Example 13 | CE4 = 100 | B1 = 5 | C1 = 5 | 0.5 | 0.1 | — |
| Example 14 | CE5 = 91 | B1 = 6 | C1 = 4 | 0.4 | 0.11 | PL1 = 9 |
| Example 15 | CE5 = 83 | B1 = 6 | C1 = 4 | 0.4 | 0.12 | PL1 = 17 |

|  | Cylinder temperature during kneading and molding (° C.) | Haze (%) | Tensile elastic modulus (MPa) | Tensile breaking strain (%) | Surface-impact resistance (m) | Screw squeal |
|---|---|---|---|---|---|---|
| Example 1 | 220 | 2.0 | 2280 | 32 | 0.8 | No |
| Example 2 | 220 | 2.4 | 2340 | 28 | 0.8 | No |
| Comparative Example 1 | 220 | 10.2 | 2310 | 29 | 0.2 | Yes |
| Example 3 | 220 | 2.3 | 2110 | 37 | 0.6 | No |
| Example 4 | 220 | 2.7 | 2740 | 21 | 0.6 | No |
| Example 5 | 220 | 2.3 | 2040 | 47 | 0.4 | No |
| Example 6 | 220 | 2.7 | 2770 | 12 | 0.4 | No |
| Comparative Example 2 | 220 | 8.8 | 2890 | 4 | 0.2 | Yes |
| Example 7 | 220 | 7.8 | 2270 | 31 | 0.8 | No |
| Example 8 | 220 | 7.1 | 2280 | 30 | 0.8 | No |
| Example 9 | 220 | 10.5 | 2270 | 33 | 0.8 | No |
| Example 10 | 220 | 10.4 | 2290 | 33 | 0.8 | No |
| Comparative Example 3 | 220 | 14.9 | 2280 | 30 | 0.2 | Yes |
| Comparative | 220 | 15.5 | 2260 | 32 | 0.2 | Yes |

TABLE 2-continued

| Example 4 | | | | | | |
|---|---|---|---|---|---|---|
| Example 11 | 220 | 2.1 | 2690 | 17 | 0.8 | No |
| Example 12 | 220 | 2.6 | 2410 | 29 | 0.8 | No |
| Example 13 | 220 | 2.7 | 1900 | 33 | 1 | No |
| Example 14 | 260 | 6.5 | 3140 | 8 | 0.6 | No |
| Example 15 | 240 | 4.1 | 2640 | 11 | 0.8 | No |

The results described above indicate that the resin molded articles of the examples have excellent surface-impact resistance while suppressing a decrease in transparency as compared with the molded articles of the comparative examples. Specifically, in Comparative Examples 1 to 4 using the resin molded article containing the poly(meth)acrylate-based compound (C) having a weight-average molecular weight of 50,000 or more, the low surface-impact resistance is exhibited, and screw squeal is generated. While in Examples 1 to 15 using the resin molded article containing the poly(meth)acrylate-based compound (C) having a weight-average molecular weight of less than 50,000, the good surface-impact resistance is exhibited and screw squeal is suppressed.

Also, when the mass ratio of the poly(meth)acrylate-based compound (C) to the total of the polylactic acid (B) and the poly(meth)acrylate-based compound (C) is 0.3 or more and 0.7 or less, the produced resin molded article has a low haze value, that is, suppressed decrease in transparency, and excellent surface-impact resistance, as compared with in Examples 9 and 10 in which the mass ratio is less than 0.3 or exceeds 0.7. Further, in Example 1 in which the total mass ratio of the polylactic acid (B) and the poly(meth)acrylate-based compound (C) to the cellulose ester compound (A) is 0.05 or more and less than 1, the produced resin molded article has a low haze value, that is, suppressed decrease in transparency, and excellent surface-impact resistance, as compared with in Examples 5 and 6 in which the mass ratio is less than 0.05 or 1 or more.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A resin composition comprising:
    a cellulose ester compound (A);
    polylactic acid (B); and
    a poly(meth)acrylate-based compound (C) having a weight-average molecular weight (Mw) of less than 50,000.
2. The resin composition according to claim 1, wherein the cellulose ester compound (A) is at least one selected from cellulose acetate propionate (CAP) and cellulose acetate butyrate (CAB).
3. The resin composition according to claim 2, wherein the cellulose ester compound (A) is cellulose acetate propionate (CAP).
4. The resin composition according to claim 1, wherein the poly(meth)acrylate-based compound (C) is a compound containing 50% by mass or more of a constituent unit derived from a (meth)acrylic acid alkyl ester.
5. The resin composition according to claim 4, wherein the poly(meth)acrylate-based compound (C) is a poly(meth)acrylic acid alkyl ester having an alkyl chain having 1 or more and 8 or less carbon atoms.
6. The resin composition according to claim 5, wherein the poly(meth)acrylate-based compound (C) is polymethyl methacrylate.
7. The resin composition according to claim 1, wherein the total mass ratio of the polylactic acid (B) and the poly(meth)acrylate-based compound (C) to the cellulose ester compound (A) is 0.05 or more and less than 1.
8. The resin composition according to claim 1, wherein the mass ratio of the poly(meth)acrylate-based compound (C) to the total of the polylactic acid (B) and the poly(meth)acrylate-based compound (C) is 0.3 or more and 0.7 or less.
9. The resin composition according to claim 7, wherein the content of the cellulose ester compound (A) in the resin composition is 50% by mass or more.
10. A resin molded article comprising the resin composition according to claim 1.
11. The resin molded article according to claim 10, wherein when the resin molded article has a thickness of 2 mm, the haze value is 10% or less.
12. The resin molded article according to claim 10, wherein the resin molded article is an injection molded article.

* * * * *